(No Model.)
M. TEMPLIN.
CULTIVATOR SHOVEL.
No. 440,090. Patented Nov. 4, 1890.
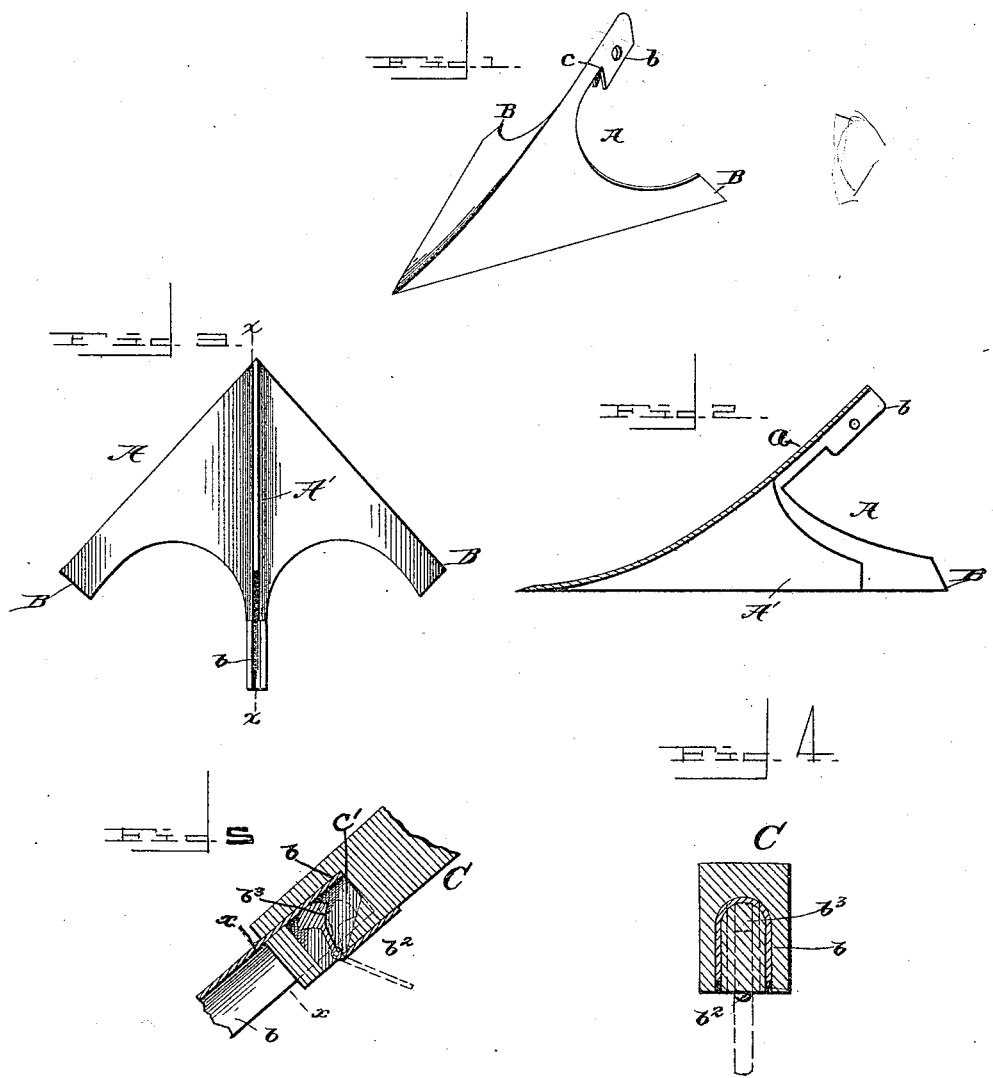

UNITED STATES PATENT OFFICE.

MARIAN TEMPLIN, OF ST. MARY'S, KANSAS.

CULTIVATOR-SHOVEL.

SPECIFICATION forming part of Letters Patent No. 440,090, dated November 4, 1890.

Application filed January 22, 1890. Serial No. 337,684. (No model.)

*To all whom it may concern:*

Be it known that I, MARIAN TEMPLIN, a citizen of the United States of America, residing at St. Mary's, in the county of Pottawatomie and State of Kansas, have invented certain new and useful Improvements in Cultivator-Shovels, of which the following is a specification, reference being had therein to the accompanying drawings.

My invention relates to certain improvements in plows; and it consists in the peculiar construction, combination, and arrangement of the parts, as hereinafter more fully shown and described.

In the accompanying drawings, Figure 1 is a perspective view of my plow. Fig. 2 is a longitudinal section on the line $x\,x$ of Fig. 3, and Fig. 3 is an inverted plan view of my invention.

In the embodiment of my invention I construct plow-shovel A with wings B of similar form to flare rearwardly from the point of the plow, as shown. I fashion its shank $a$ to extend obliquely upward from the rear end thereof, formed into an approximately inverted-U-shaped portion $b$, having near its center an offset $c$. Extending from the point of the plow A is a central longitudinal and downwardly-projecting plate or keel A′, integral with the shovel, which, extending the whole length of the plow, serves as a guide to prevent the plow from suddenly swerving from its course.

C is the plow-standard, having hung in a recess $c'$ therein a cam $b^3$, provided with a right-angled arm $b^2$, whereby as connection is effected between said standard and the shank of the shovel the cam will be thrown or forced against the said shank between the flanges of the portion or keeper $b$, causing the arm $b^2$ to engage or bear against and hold the standard in place. Thus arranged a very efficient plow-point is produced and one that may be readily applied to or detached from the plow.

Having thus fully described my invention, what I claim, and desire to secure by Letters Patent, is—

The combination, with the plow or shovel shank having the inverted-U-shaped portion or keeper at its upper end, of the standard carrying in a recess therein the cam having a right-angled arm, said cam engaging said shank and said arm engaging said standard, substantially as and for the purpose set forth.

In testimony whereof I affix my signature in presence of two witnesses.

MARIAN TEMPLIN.

Witnesses:
GEORGE H. MACKAY,
H. H. HEYAN.